(12) United States Patent
Nielsen (10) Patent No.: US 8,843,223 B2
(45) Date of Patent: Sep. 23, 2014

(54) TEST SYSTEM WITH DIGITAL CALIBRATION GENERATOR

(75) Inventor: Lars Birger Nielsen, Roskilde (DK)

(73) Assignee: Bruel & Kjaer Sound & Vibration Measurement A/S, Naerum (DK)

( * ) Notice: Subject to any disclaimer, the term of this patent is extended or adjusted under 35 U.S.C. 154(b) by 613 days.

(21) Appl. No.: 13/127,117

(22) PCT Filed: Sep. 22, 2009

(86) PCT No.: PCT/EP2009/062259
§ 371 (c)(1),
(2), (4) Date: Jul. 8, 2011

(87) PCT Pub. No.: WO2010/060669
PCT Pub. Date: Jun. 3, 2010

(65) Prior Publication Data
US 2011/0258489 A1    Oct. 20, 2011

Related U.S. Application Data

(60) Provisional application No. 61/164,743, filed on Mar. 30, 2009.

(30) Foreign Application Priority Data

Nov. 3, 2008  (DK) .................................. 2008 01512

(51) Int. Cl.
| | | |
|---|---|---|
| *G06F 17/00* | (2006.01) | |
| *H04B 17/00* | (2006.01) | |
| *H04S 7/00* | (2006.01) | |
| *H04M 1/24* | (2006.01) | |
| *H04M 1/253* | (2006.01) | |

(52) U.S. Cl.
CPC ............. *H04M 1/24* (2013.01); *H04B 17/0062* (2013.01); *H04M 1/2535* (2013.01); *H04B 17/0085* (2013.01); *H04S 7/00* (2013.01)
USPC .............................................. 700/94; 381/58

(58) Field of Classification Search
USPC ................... 700/94; 381/58, 59, 60, 123, 318
See application file for complete search history.

(56) References Cited

U.S. PATENT DOCUMENTS 7,593,781 B1 *   9/2009   Rhea ............................... 700/94
2006/0062407 A1   3/2006   Kahan (Continued)

FOREIGN PATENT DOCUMENTS

| WO | 01/11854 A1 | 2/2001 |
|---|---|---|
| WO | 02/082790 A1 | 10/2002 |
| WO | 2007/110476 A1 | 10/2007 |

OTHER PUBLICATIONS

Written Opinion corresponding to International Patent Application No. PCT/EP2009/062259, European Patent Office, dated Dec. 28, 2009, (2 pages).

(Continued)

*Primary Examiner* — Joseph Saunders, Jr.
(74) *Attorney, Agent, or Firm* — Nixon Peabody LLP (57) ABSTRACT

The present invention relates to calibration of a computerized test system (20) for testing digital audio devices (30) through a data communication interface. The computerized test system comprises a sound card and a digital calibration generator (31) for calibrating at least a signal receipt channel (25) of the computerized test system (20).

11 Claims, 3 Drawing Sheets

(56) References Cited

U.S. PATENT DOCUMENTS

| | | | |
|---|---|---|---|
| 2008/0037804 A1* | 2/2008 | Shmunk | 381/96 |
| 2008/0133036 A1* | 6/2008 | Chen et al. | 700/94 |
| 2009/0080668 A1* | 3/2009 | Zhou et al. | 381/58 |
| 2010/0150358 A1* | 6/2010 | Valenti, III | 381/58 |

OTHER PUBLICATIONS

International Search Report corresponding to International Patent Application No. PCT/EP2009/062259, European Patent Office, dated Dec. 28, 2009,(6 pages).

* cited by examiner

Fig. 3

TEST SYSTEM WITH DIGITAL CALIBRATION GENERATOR

CROSS-REFERENCE TO RELATED APPLICATIONS

This application is a U.S. National Stage of International Application No. PCT/EP2009/062259, filed Sep. 22, 2009, which claims the benefit of Danish Patent Application No. PA 2008 01512, filed on Nov. 3, 2008, and US Provisional Patent Application No. 61/164,743, filed on Mar. 30, 2009, all of which are incorporated herein by reference in their entireties.

The present invention relates to calibration of a computerized test system for testing digital audio devices through a data communication interface. The computerized test system comprises a digital calibration generator for calibrating at least a signal receipt channel of the computerized test system.

BACKGROUND OF THE INVENTION

A computerized test system for digital audio devices which is based on a personal computer with an internal or external sound card can provide a wide range of desirable functions for testing electroacoustical characteristics of the digital audio devices. Using a personal computer coupled to standard sound card keeps costs of hardware components at a very moderate level despite an ability to build a highly sophisticated and flexible test system with a user friendly graphical interface.

However, substantial challenges persist in unlocking the performance potential of such personal computer based test systems for accurate and fast measurements of the electroacoustic characteristics of the digital audio devices. Standard sound cards are generally not designed for use in critical test and measurement systems and therefore lack tight control of frequency responses of test signal generating channels and response signal receipt channels. This lack of accuracy may be contributed to a number of different factors such as frequency response variations of analog input and output buffers or amplifiers, aliasing filters, ND and D/A converters etc. This means that absolute levels of test signals and response signals presented to, and generated by, the digital audio device are inaccurate and therefore lead to an inaccurate determination of the electro-acoustic characteristics of device under examination.

PRIOR ART

WO 2002/082790 discloses a computer controlled test system for testing electrical impedance of telephone lines. The test system uses a standard sound card mounted in a portable personal computer. A sound card outlet is used for applying test signals to the telephone line at a plurality of frequencies through a series connected test resistor. The voltage drop across the test resistor is measured by detecting test resistor voltages on two input channels L/R of the sound card and the telephone line impedance is computed from the measured voltage drop. The test system includes a calibration mode or setting where the telephone line is disconnected and the output signal from the sound card outlet is applied to the test resistor. The voltages across the test resistor are coupled to the two input channels of the sound card to detect a voltage drop over the test resistor.

U.S. 2006/062407 discloses a computer controlled test system for acoustical test of loudspeakers. The test system uses a standard sound card mounted in a personal computer. During loudspeaker testing commands are transmitted through a data interface to a loudspeaker control unit mounted inside the loudspeaker under test. The test commands may order the loudspeaker to playback a particular test signal stored in the loudspeaker control unit. An input channel of the standard sound card is adapted to capture a response signal produced by the loudspeaker under test. The test system comprises a calibration function where a rectangular analog pulse is applied to the input channel of the standard sound card to determine its transfer function.

WO 2007/110476 discloses a method of finding maximum input and output signal levels of a sound card by connecting of a feedback loop between an input and an output of the sound card.

SUMMARY OF INVENTION

According to a first aspect of the invention, there is provided a computerized test system for digital audio devices, comprising: a personal computer operatively connected to a sound card. The sound card comprises a sound card input for receipt of an analog test signal, an ND converter adapted to convert the analog test signal to a digital test signal, a D/A converter operatively coupled to a signal receipt channel for receipt of a digital response signal and for conversion into an analog output signal provided on a sound card output. A digital calibration generator adapted to generate a digital calibration signal of predetermined level and spectral content according to calibration signal data supplied by a calibration program executable on the personal computer. A data communication interface is adapted to transmit and/or receive data in accordance with a predetermined communication protocol. The data communication interface comprising an encoder adapted to receive, encode and transmit the digital test signal or the digital calibration signal to an external digital audio device and a decoder adapted to receive and decode an encoded digital response signal from the external digital audio device to provide the digital response signal to the signal receipt channel. A switching arrangement, operating in accordance with a mode control signal supplied by the calibration program, is configured to selectively operate the computerized test system in either:
- a first mode wherein the digital calibration signal is routed through a cascaded encoder and decoder to couple the digital calibration signal to the signal receipt channel; or
- a second mode wherein the digital test signal is routed through the data communication interface to the external digital audio device.

The digital calibration signal preferably comprises a digital audio signal with a frequency between 20 Hz and 20 kHz such as between 100 Hz and 10 kHz or between 300 Hz and 3 kHz to allow the acoustic performance or characteristics of the digital audio device under test to be evaluated in a smaller or larger portion of the audible frequency range.

The first mode of the computerized test system allows frequency response determination to be made of certain portions of the test signal receipt channel and/or test signal generating channel conveying the test signals and digital response signals forth and back through the computerized test system during test of the digital audio devices. Calibration data characterizing at least a measured frequency response of the cascaded encoder and decoder of the data communication interface is preferably determined and stored in an appropriate memory location of the personal computer such as a file in the computer data memory or on an optical disc or hard disc. In a preferred embodiment of the invention, the calibration data characterizes both a measured frequency response of the signal receipt channel and a measured frequency response of the signal transmission channel. This ensures that the respective frequency responses of all sound card circuits such as the A/D and D/A converters, and the cascaded encoder and decoder of the data communication interface are included in the calibration data. Alternatively, the calibration data may only characterize frequency responses of one or more specific sound card circuits, such as the A/D converter and/or D/A converter, if the respective frequency responses of the residual sound card circuits are known to be accurate.

In certain embodiments of the invention, a down sampler has been arranged at an input of the encoder and/or an up-sampler has been arranged in the signal receipt channel in-between the decoder and the D/A converter. The down sampler may be configured to convert the digital test signal and/or the digital calibration signal from a first sample rate to a second and lower sample rate. The first sample rate or frequency may be a standardized digital audio sampling frequency such as 32, 44.1 or 48 kHz while the second sample rate may be a lower sample rate such as anyone of 22.05 kHz, 16 kHz or 8 kHz or any other lower sample rate. The lower sample rate may be set so as to be compatible with specific requirements of the encoder of the data communication interface or compatible with sample rate requirements imposed by the digital audio device. The up-sampler may be adapted to convert the digital response signal from the above-mentioned second sample rate, such as 16 kHz or 8 kHz, to a higher sample rate which may be required for compatibility with particular requirements of a sound card D/A converter. The sound card D/A converter may be only capable of operating on a limited number of standard digital audio sample rates such as 32 kHz, 44.1 kHz or 48 kHz or unable to upsample the digital response signal with appropriate signal quality.

The digital calibration generator may be implemented in a number of different ways either by software of hardware or a combination of both. In one embodiment, the digital calibration generator is provided as a programmable logic block where internal setting registers are used to set a calibration signal frequency and a level. In another embodiment of the invention the digital calibration generator is adapted to generate the digital calibration signal by reading a prestored set of digital audio samples of the digital calibration signal from a data file. The prestored set of digital audio samples may be written to a sound card memory and repetitively played from the sound card memory. The digital audio samples may be written to the sound card memory by a Direct-X API or other suitable Windows driver. Values of individual audio samples of the plurality of digital audio samples may have been computed and written to the data file by a commercially available technical computing program such as MATLAB or by a proprietary computing program specifically designed for the purpose.

According to a preferred embodiment of the present computerized test system, the digital calibration generator is adapted to generate the digital calibration signal by computation of digital audio samples according to a predetermined mathematical algorithm and streaming computed digital audio samples to a sound card memory for subsequent replay or playback. Since this embodiment streams the digital audio samples directly to the sound card memory there is no need for any pre-stored data file (for repetitive playback). Consequently, erroneous calibration of the computerized test system caused by accidental selection of a wrong pre-stored data file is prevented. Furthermore, digital calibration signals with complex waveforms, for example non-repetitive waveforms or waveforms with long repetition time, are readily generated by the predetermined mathematical algorithm without occupying extensive amounts of sound card memory.

The data communication interface may comprise a data interface selected from a group of {Wireless or wired local area network, Bluetooth, Universal Serial Bus (USB), RS232, I²C, SPI}. In one embodiment of the invention, a wired or wireless LAN interface is adapted to organize the set of digital audio samples of an encoded digital test signal into data packages in accordance with a Real-time Transport Protocol (RTP) for transmission to the digital audio device under test. In certain advantageous embodiments of the invention, the computerized test system comprises several different types of data communication interfaces so that different types of external digital audio devices, for example Bluetooth mobile phones, Bluetooth enabled hearing instruments, headphones or headsets and LAN enabled Internet Protocol (IP) phones, are testable by the same computerized test system. The signal gain or loss, or other vital audio characteristics, of the encoder and decoder portions of each type of data communication interface will in many situations be unknown factors. The present computerized test system and calibration program are therefore highly useful in determining these vital audio characteristics of the data communication interface so that accurate testing of an external digital audio device can be performed.

The calibration program preferably comprises a Graphical User Interface with control buttons and/or entry boxes allowing an operator to select one or more of the following modes or parameters of the computerized test system:
a) setting the control signal to select the first or second operation mode of the computerized test system,
b) setting a frequency and level of the digital calibration signal,
c) altering a sample rate of the digital response signal or altering a sample rate of the digital calibration signal,
d) enabling or disabling the digital calibration generator through the mode control signal,
e) controlling characteristics of a loop-back signal path in the first mode,
f) establishing an audio communication path to the digital audio device through the data communication interface for example by utilizing Session Initiation Protocol (SIP) often used for Voice over IP.

A second aspect of the invention relates to a method of determining frequency response calibration data of a sound card based computerized test system; the method comprises steps of:
a) generating a digital audio calibration signal of predetermined level and spectral content according to calibration signal data supplied by a calibration program,
b) encoding the digital audio calibration signal by an encoder of a data communication interface to provide an encoded digital audio calibration signal,
c) routing the encoded digital audio calibration signal to a decoder of the data communication interface to generate a decoded digital audio calibration signal,
d) routing the decoded digital audio calibration signal through a signal receipt channel of the sound card,
e) converting the decoded digital audio calibration signal to an analog output signal in a D/A converter of the sound card and routing the analog output signal to a sound card output,
f) determining a first frequency response between the digital audio calibration signal and the analog output signal,
g) applying an analog test signal to a sound card input of the sound card,
h) converting the analog test signal to a digital test signal by an ND converter of the sound card, i) determining a second frequency response between the analog test signal and the digital test signal,
j) determining and storing a set of calibration data characterizing the first and second frequency responses.

Each of the first and second frequency responses may be based on respective measurements of gain, and optionally phase, at a few predetermined frequencies in the audible range between 20 Hz and 20 kHz in step f) and step i). However, if more elaborate first and second frequency response characteristics are required, they may be determined at a set of additional frequencies such as between 10 and 100 additional frequencies.

The set of calibration data are preferably stored in an appropriate memory location or file structure associated with the calibration program. In one embodiment of the invention, the set of calibration data are automatically retrieved and transmitted via communication interface to an external audio analyzer and generator coupled to the sound card input and output. The external audio analyzer and generator is adapted to compute or set appropriately calibrated levels of the analog test signal applied to the sound card input based on the set of calibration data. In another embodiment, the set of calibration data are manually retrieved from the present computerizes test system by a test operator and manually entered into an appropriate location in the combined audio analyzer and generator. In yet another embodiment of the invention, the determined set of calibration data may be used to directly, either automatically or manually, adjust one or more gain values at specific audio frequencies in a sound processing circuit of the sound card such as a programmable preamplifier, a D/A or A/D converter etc, to compensate for measured frequency response deviations from nominal or calibrated frequency responses.

BRIEF DESCRIPTION OF THE DRAWINGS

A preferred embodiment of the invention will be described in more detail in connection with the append drawings, in which.

DESCRIPTION OF PREFERRED EMBODIMENTS

Figure 1:
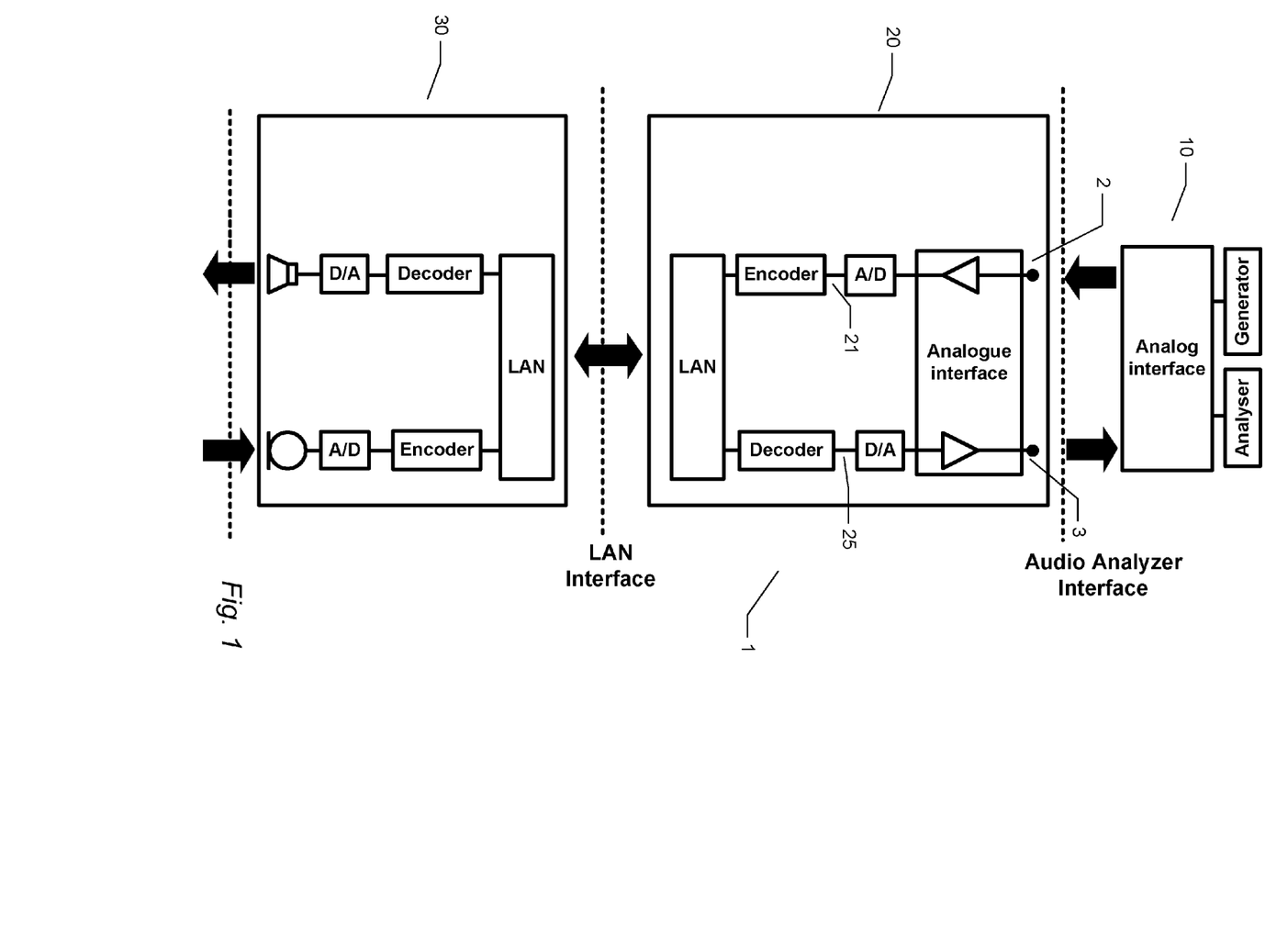
FIG. 1 is a schematic drawing of a measurement set-up for testing a digital audio device by a computerized test system operating in a test mode in accordance with an embodiment of the present invention.

FIG. 1 shows a measurement set-up 1 for testing an external digital audio device 30 by a computerized test system 20 in accordance with the present invention. A combined audio analyzer and generator 10 is electrically connected to a sound card input 2 of the computerized test system 20, which input 2 is adapted for receipt of analog input or test signals supplied by a generator portion of a combined audio analyzer and generator 10. The test signals may be signals adapted to measure various performance parameters of the digital audio device 30 or audio device 30 under test such as its frequency response, maximum output sound pressure, non-linear distortion, rub-buzz noise, input/output characteristics etc according to relevant measurement standards for the particular device under test. The audio device 30 may for example comprise an IP telephone which is tested according to one or more of ITU recommendations ITU-T P58, P64 and P79.

The computerized test system 20 is capable of operating in two different test modes depending on settings of an internal switching arrangement. In the depicted second mode, or test mode, input or test signals generated by the combined audio analyzer and generator 10 are routed through the signal generator channel 21 and transmitted through the data communication interface, indicated as LAN interface, to the audio device 30 which itself comprises LAN compatible data interface adapted to receive the test signal. In a first mode, or calibration mode, input or test signals generated by the combined audio analyzer and generator 10 are routed through a signal generator channel but instead of being transmitted through the LAN interface to the audio device 30 under test, the test signal is looped around a cascased of the encoder and decoder of the data communication interface and returned to an sound card output 3 via a signal receipt channel 25 of the computerized test system 20. Operation of the computerized test system 20 in the test and calibration modes will be explained in detail in connection with FIGS. 2 & 3 below.

The audio device 30 may comprise various stationary or portable communications or mobile terminals with integral data communication interfaces such as an IP phone, mobile phone, Bluetooth head-set etc. through which uni-directional or duplex digital audio data are communicated. The data communication interface may comprise a wired or wireless local area network interface. According to a preferred embodiment of the invention, the computerized test system 20 comprises LAN interface, but other embodiments of the invention may instead or additionally comprises one or more of the following data communication interfaces; Bluetooth, Universal Serial Bus (USB), RS232, $I^2C$, SPI.

Figure 2:
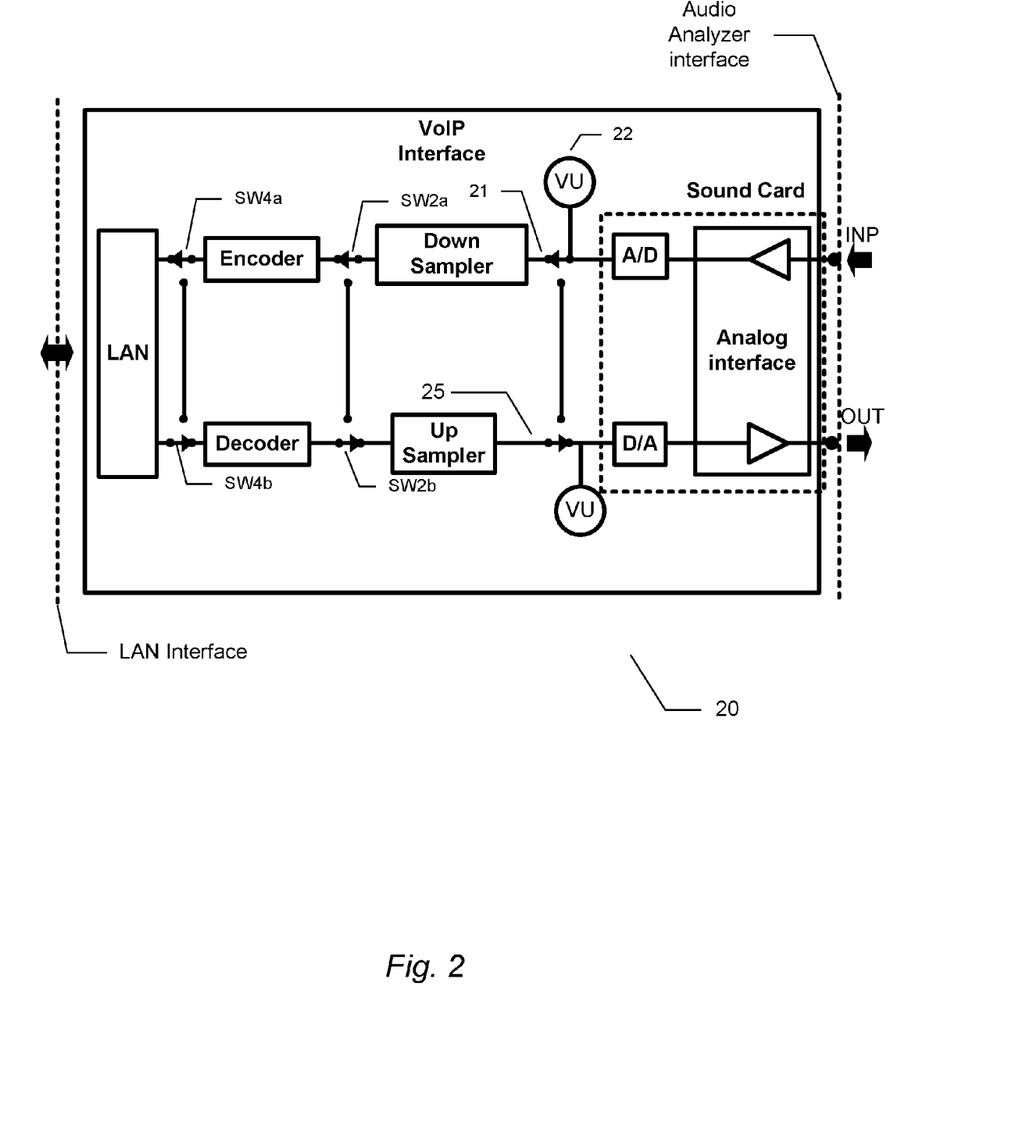
FIG. 2 is a schematic drawing of the computerized test system operating in the test mode.

FIG. 2 is a schematic drawing of the computerized test system 20 configured in the second or test mode or state as depicted in the measurement set-up 1 of FIG. 1. A test generator signal is received on a sound card input, INP, placed on a standard sound card, inside indicated dotted box, and adapted for receipt of analog test signals. A preamplifier amplifies or buffers the analog test signal and forwards a buffered/amplified test signal to an A/D converter which converts the buffered/amplified analog test signal to a corresponding digital test signal with a predetermined resolution and sample rate for example 16 bits at 16, 44.1 or 48 kHz sample rates. An input channel level meter 22, indicated by symbol VU, allows determination or computation of an absolute signal level of the digital test signal for calibration purposes as will be explained later on. An optional down-sampler is adapted to receive the digital test signal and convert its sample rate to a lower sample rate which is compatible with particular requirements of the encoder of the LAN based data communication interface or requirements to the sample rate imposed by the digital audio device 30.

After encoding, a coded digital test signal is transmitted through the LAN interface to the audio device 30 (refer to FIG. 1) which includes an appropriate decoder for converting the coded digital test signal to a suitable digital audio test signal for application to an electroacoustical transducer of the audio device 30. A response signal of the audio device 30 may in one situation be measured in an artificial ear or another type of acoustic load or coupler acoustically coupled to the electroacoustical transducer of the audio device 30 and recorded by an analyzer input of the combined audio analyzer and generator 10. In this application, the data communication interface may solely support unidirectional transmission of data, i.e. transmission from the computerized test system 20 to the audio device 30. However, the data communication interface will preferably support duplex-data transmission so that for example a response signal generated by the indicated microphone of the audio device 30 is transmitted across the data communication interface simultaneously with the transmission of the digital test signal in opposite direction and transmitted through the signal receipt channel 25 to the sound card output 3 connected to an analyzer input of the combined audio analyzer and generator 10. The signal receipt channel may comprise the indicated, but optional, up-sampler which is adapted to convert a sample rate of the response signal to another higher sample rate. The higher sample rate may be required in order to make the response signal compatible with particular requirements of the D/A converter which may be capable of supporting only a limited number of standard digital audio sample rates such as 32 kHz, 44.1 kHz or 48 kHz.

A switching arrangement comprising switches SW1*a,b*; SW2*a,b* and SW4*a,b* which are coupled into various signal nodes of the signal receipt channel 25 and the input signal channel 21 allows an operating state or mode of the computerized test system 20 to toggle between two different modes in accordance with a mode control signal supplied by a calibration program running on the portable computer. As mentioned-above the mode depicted in FIG. 2 is the second or test mode.

The skilled person will understand that the computerized test system may be implemented as software/application programs or program routines running or executable on a suitable microprocessor of the personal computer or a sound card processor. This means that each of the schematically depicted signal processing functions or signal routing functions such as the down-sampler, up-sampler, encoder, decoder or switches SW1*a,b*; SW2*a,b* and SW4*a,b* can be implemented partly or entirely as computer program code or routines for example written in C++ in a suitable software development tool. The same applies to the digital calibration generator 31 depicted in FIG. 3. Some of these functions may alternatively be implemented by dedicated logic circuit blocks such as programmable gate arrays that may be configured or programmed in accordance with commercially available libraries of logic functions.

Figure 3:
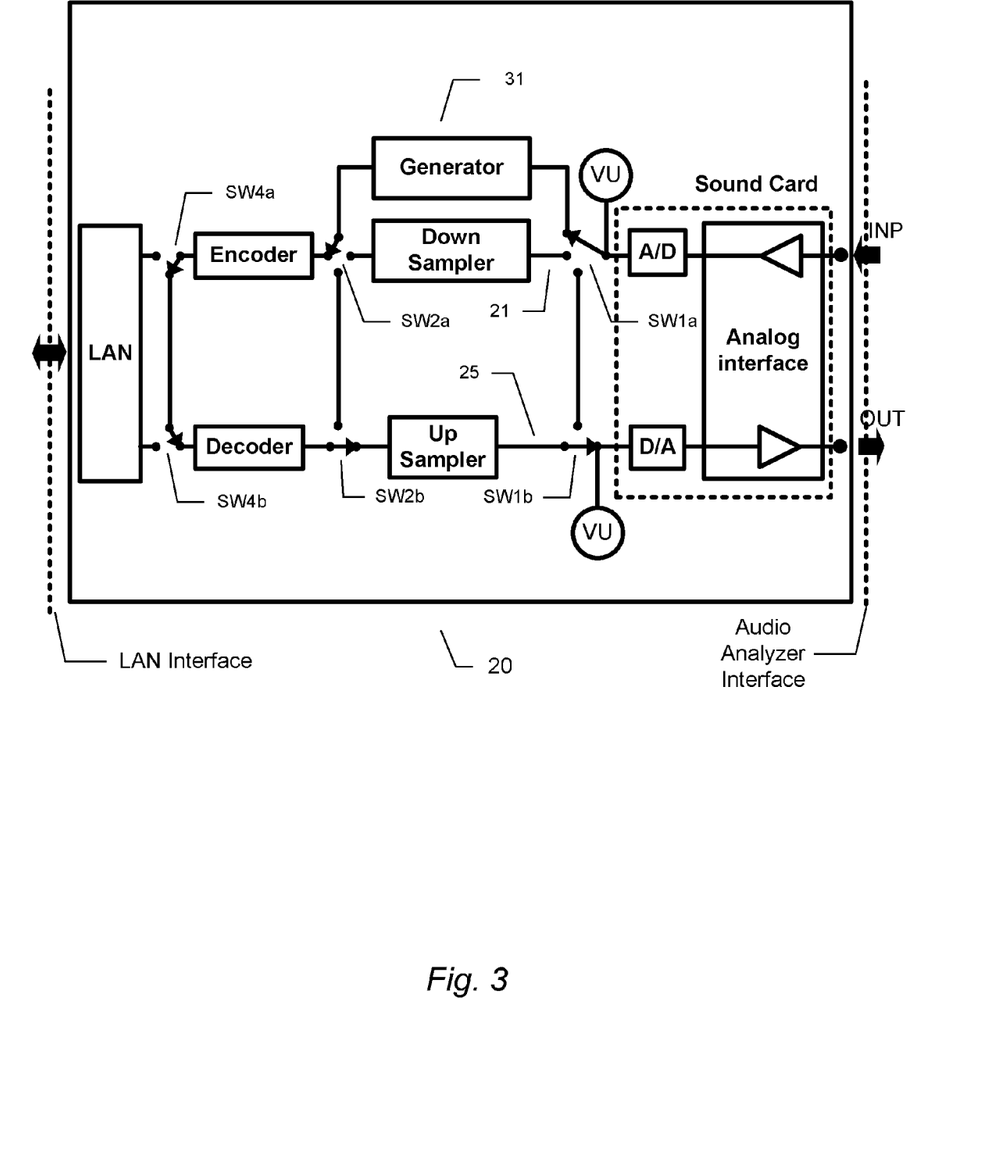
FIG. 3 is a schematic drawing of the computerized test system operating in a calibration mode.

FIG. 3 is a schematic drawing of the computerized test system 20 configured in the first or calibration mode or state by virtue of the indicated setting of the switching arrangement comprising SW1*a,b*; SW2*a,b* and SW4*a,b*. The indicated setting of the switching arrangement routes the digital calibration signal through the cascaded output of the encoder and input of the decoder so as to couple the digital calibration signal to the signal receipt channel 25. In this calibration mode, the computerized test system 20 preferably determines a first frequency response between the digital calibration signal and the sound card output, OUT, i.e. around the cascaded encoder-decoder ("loop back coupling"), up-sampler and residual portion of the signal receipt channel 25 towards the sound card output, OUT. A second frequency response between the analog input signal, applied to the sound card input 2, and a measurement node at the input channel level meter 22 (VU meter) is preferably likewise measured so that the respective chains of audio processing elements or circuits of the computerized test system 20 are characterized in terms of frequency response or a least gain values at one or more relevant audio frequencies such as 400 Hz, 1 kHz, 3 kHz etc, or any other set of frequencies in the audible range between 20 Hz and 20 kHz.

The digital calibration generator 31 generates a digital calibration signal of predetermined level and spectral content according to calibration signal data supplied by the calibration program running on the personal computer. The digital calibration signal may comprise a narrow-band sinusoidal signal centred at a single predetermined frequency, such as 1 kHz, or at a predetermined set of frequencies across a target frequency range to determine signal loss and gain at each frequency. A complete frequency response is preferably determined throughout a certain target frequency range as between 20 Hz and 20 kHz, or between 200 Hz and 4 kHz. The frequency response including signal gain/loss, and optional phase, at a specific set of frequencies can accordingly be measured across a narrow or a wide audio frequency band or range depending on for example measurement bandwidth requirements of a particular measurement standard.

Calibration data computed from the determined first and second frequency responses are subsequently stored in an appropriate memory location or file structure associated with the calibration program for retrieval and automatic transmission to, or manual entry into, the combined audio analyzer and generator 10. The combined audio analyzer and generator 10 is adapted to subsequently read the calibration data to commute or set appropriately calibrated levels of the analog test signal during a test of a digital audio device. In other embodiments of the invention, determined calibration data may be used to directly adjust one or more gain values in a programmable preamplifier or A/D converter of the sound card to reach a nominal or calibrated gain value. Likewise, one or more gain values may be applied directly in the signal receipt channel 25 to obtain a nominal or calibrated gain value therein.

In some embodiments of the present computerized test system 20, the frequency response of the cascaded encoder-decoder may be known a priori which makes it superfluous to measure this particular frequency response of in the signal paths during a calibration cycle. Therefore switches SW2*a,b* may be set to a position opposite of the one indicated on FIG. 3 so that the encoder and decoder are bypassed and the frequency response is measured or determined for the residual portion of the signal receipt channel 25. In some situations it may even be advantageous to measure the frequency responses in both states of switches SW2*a,b* so that each frequency response can be separately determined for each signal path.

The invention claimed is:

1. A computerized test system for digital audio devices, comprising:
   a personal computer operatively connected to a sound card,
   said sound card comprising a sound card input for receipt of an analog test signal, an A/D converter adapted to convert the analog test signal to a digital test signal, a D/A converter operatively coupled to a signal receipt channel for receipt of a digital response signal and for conversion into an analog output signal provided on a sound card output;
   a digital calibration generator adapted to generate a digital calibration signal of predetermined level and spectral content according to calibration signal data supplied by a calibration program executable on the personal computer;
   a data communication interface being adapted to transmit and/or receive data in accordance with a predetermined communication protocol,
   the data communication interface comprising an encoder adapted to receive, encode and transmit the digital test signal or the digital calibration signal to an external digital audio device and a decoder adapted to receive and decode an encoded digital response signal from the external digital audio device to provide the digital response signal to the signal receipt channel; and a switching arrangement, operating in accordance with a mode control signal supplied by the calibration program, configured to selectively operate the computerized test system in either:
- a first mode wherein the digital calibration signal is routed through a cascade of the encoder and decoder to couple the digital calibration signal to the signal receipt channel or
- a second mode wherein the digital test signal is routed through the data communication interface to the external digital audio device.

2. The computerized test system according to claim 1, comprising a down sampler arranged at the input of the encoder and/or an up-sampler arranged in the signal receipt channel in-between the decoder and the D/A converter.

3. The computerized test system according to claim 2, wherein the digital calibration generator is further adapted to:
- form the digital calibration signal by reading a pre-stored set of digital audio samples defining the digital calibration signal from a data file,
- write the digital calibration signal to a sound card memory, and
- repetitively play the digital calibration signal from the sound card memory.

4. The computerized test system according to claim 2, wherein the digital calibration generator is adapted to:
- generate the digital calibration signal by computation of digital audio samples according to a predetermined mathematical algorithm, and
- stream computed digital audio samples to a sound card memory for subsequent replay.

5. The computerized test system according to claim 1, wherein the digital calibration generator is further adapted to:
- form the digital calibration signal by reading a pre-stored set of digital audio samples defining the digital calibration signal from a data file,
- write the digital calibration signal to a sound card memory, and
- repetitively play the digital calibration signal from the sound card memory.

6. The computerized test system according to claim 1, wherein the digital calibration generator is adapted to:
- generate the digital calibration signal by computation of digital audio samples according to a predetermined mathematical algorithm, and
- stream computed digital audio samples to a sound card memory for subsequent replay.

7. The computerized test system according to claim 1, wherein the data communication interface is configured to interface with a wired or wireless communication network that uses a local area network (LAN), a Bluetooth interface, a Universal Serial Bus (USB), an RS232 interface, a Inter-Integrated Circuit bus ($I^2C$), or a Serial Peripheral Interface Bus (SPI).

8. The computerized test system according to claim 1, wherein the calibration program comprises a Graphical User Interface with control buttons and/or entry boxes providing user control of one or more of the following modes or parameters of the computerized test system:
- a) setting the mode control signal to select the first mode or second mode of the computerized test system,
- b) setting a frequency and level of the digital calibration signal,
- c) altering a sample rate of the digital response signal or altering a sample rate of the digital calibration signal,
- d) enabling or disabling the digital calibration generator through the mode control signal,
- e) controlling characteristics of a loop-back signal path in the first mode,
- f) establishing an audio communication path to the digital audio device through the data communication interface for example by utilizing a Session Initiation Protocol.

9. The computerized test system according to claim 1, wherein the personal computer comprises a memory location storing calibration data characterizing at least a measured frequency response of the cascaded encoder and decoder of the data communication interface.

10. The computerized test system according to claim 9, wherein the calibration data additionally characterizes a frequency response of at least one of the A/D converter and D/A converter of the sound card.

11. A method of determining frequency response calibration data of a sound card based computerized test system, said method comprising steps of:
- a) generating a digital audio calibration signal of predetermined level and spectral content according to calibration signal data supplied by a calibration program,
- b) encoding the digital audio calibration signal by an encoder of a data communication interface to provide an encoded digital audio calibration signal,
- c) routing the encoded digital audio calibration signal to a decoder of the data communication interface to generate a decoded digital audio calibration signal,
- d) routing the decoded digital audio calibration signal through a signal receipt channel of the sound card,
- e) converting the decoded digital audio calibration signal to an analog output signal in a D/A converter of the sound card and routing the analog output signal to a sound card output,
- f) determining a first frequency response between the digital audio calibration signal and the analog output signal,
- g) applying an analog test signal to a sound card input of the sound card,
- h) converting the analog test signal to a digital test signal by an A/D converter of the sound card,
- i) determining a second frequency response between the analog test signal and the digital test signal, and
- j) determining and storing a set of calibration data characterizing the first and second frequency responses.

* * * * *

UNITED STATES PATENT AND TRADEMARK OFFICE
CERTIFICATE OF CORRECTION

PATENT NO. : 8,843,223 B2
APPLICATION NO. : 13/127117
DATED : September 23, 2014
INVENTOR(S) : Lars Birger Nielsen Page 1 of 1

It is certified that error appears in the above-identified patent and that said Letters Patent is hereby corrected as shown below:

In the Specification

In Column 1, Line 40, please delete "ND" and insert -- A/D --, therefor.

In Column 2, Line 21, please delete "ND" and insert -- A/D --, therefor.

In Column 4, Line 67, please delete "ND" and insert -- A/D --, therefor.

Signed and Sealed this
Twenty-fourth Day of February, 2015

Michelle K. Lee
*Deputy Director of the United States Patent and Trademark Office*